US012151358B2

(12) United States Patent
Ito et al.

(10) Patent No.: US 12,151,358 B2
(45) Date of Patent: Nov. 26, 2024

(54) POWER TOOL

(71) Applicant: MAKITA CORPORATION, Anjo (JP)

(72) Inventors: Yoshihiro Ito, Anjo (JP); Tomohiko Imae, Anjo (JP); Jun Ueda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/184,159

(22) Filed: Mar. 15, 2023

(65) Prior Publication Data

US 2023/0211489 A1 Jul. 6, 2023

Related U.S. Application Data

(63) Continuation of application No. 17/190,115, filed on Mar. 2, 2021, now Pat. No. 11,628,553.

(30) Foreign Application Priority Data

Apr. 22, 2020 (JP) ................................ 2020-076298

(51) Int. Cl.
*B25F 5/00* (2006.01)
*B25F 5/02* (2006.01)

(52) U.S. Cl.
CPC ............. *B25F 5/008* (2013.01); *B25F 5/001* (2013.01); *B25F 5/02* (2013.01)

(58) Field of Classification Search
CPC ............... B25B 21/00; B25F 5/00; B25F 5/02
See application file for complete search history.

(56) References Cited

U.S. PATENT DOCUMENTS

| | | | | |
|---|---|---|---|---|
| 7,197,961 | B2 | 4/2007 | Kageler et al. | |
| 9,114,521 | B2 | 8/2015 | Yoshikawa | |
| 2002/0096341 | A1 | 7/2002 | Hagan et al. | |
| 2011/0127059 | A1* | 6/2011 | Limberg | F16D 7/044 173/216 |
| 2016/0318165 | A1* | 11/2016 | Thorson | B25B 23/141 |
| 2021/0187707 | A1 | 6/2021 | Smith et al. | |

FOREIGN PATENT DOCUMENTS

| | | | |
|---|---|---|---|
| JP | 2003-311657 | A | 11/2003 |
| JP | 3109627 | U | 5/2005 |
| JP | 5436943 | B2 | 3/2014 |
| JP | 6537402 | B2 | 7/2019 |

OTHER PUBLICATIONS

Aug. 4, 2022 Office Action issued in U.S. Appl. No. 17/190,115.
Jan. 20, 2023 Notice of Allowance Issued in U.S Appl. No. 17/190,115.

* cited by examiner

*Primary Examiner* — Daniel Jeremy Leeds
(74) *Attorney, Agent, or Firm* — Oliff PLC

(57) ABSTRACT

A power tool including a rear cover simplifies assembly. A driver drill includes a motor including a stator and a rotor rotatable relative to the stator, a motor housing accommodating the motor, being cylindrical, and including a left housing and a right housing being laterally separable, a grip connected to a lower portion of the motor housing, an output unit in front of the motor and driven by the motor, and a rear cover supporting a rear portion of the rotor and closing a rear portion of the motor housing. The rear cover is held and fastened between the left housing and the right housing.

7 Claims, 18 Drawing Sheets

POWER TOOL

CROSS-REFERENCE TO RELATED APPLICATIONS

This is a Continuation of U.S. patent application Ser. No. 17/190,115 filed Mar. 2, 2021, which in turn claims the benefit of priority to Japanese Patent Application No. 2020-076298, filed on Apr. 22, 2020, the entire contents of which are hereby incorporated by reference.

BACKGROUND

1. Technical Field

The present disclosure relates to a power tool such as a driver drill.

2. Description of the Background

A known power tool such as a driver drill includes a motor accommodated in the rear of a cylindrical motor housing extending in the front-rear direction, and an output unit such as a spindle located in front of the motor housing via a reducing mechanism. In this case, the motor housing is assembled by screwing laterally separated housing halves together. In the structure described in Japanese Patent No. 6537402 (hereafter, Patent Literature 1), for example, the motor includes a rotational shaft axially held by a bearing supported on a separate bearing holder, which is fastened to the housing halves by screwing.

BRIEF SUMMARY

Such a separate bearing holder fastened by screwing as in the Patent Literature 1 complicates assembly. To mount such a bearing holder, the motor housing may use a screwing portion such as a screw boss inside. This radially upsizes the motor housing.

One or more aspects of the present disclosure are directed to a power tool including a rear cover that simplifies assembly.

A first aspect of the present disclosure provides a power tool, including:

a motor including a stator and a rotor rotatable relative to the stator;

a motor housing accommodating the motor, the motor housing being cylindrical and including a left housing and a right housing being laterally separable;

a grip connected to a lower portion of the motor housing;

an output unit in front of the motor and driven by the motor; and a rear cover supporting a rear portion of the rotor and closing a rear portion of the motor housing, the rear cover being held and fastened between the left housing and the right housing.

A second aspect of the present disclosure provides a power tool, including:

a motor including a stator and a rotor rotatable relative to the stator;

a motor housing accommodating the motor, the motor housing being cylindrical and including a left housing and a right housing being laterally separable;

a grip connected to a lower portion of the motor housing;

an output unit in front of the motor and driven by the motor;

a rear cover supporting a rear portion of the rotor and closing a rear portion of the motor housing, the rear cover being held and fastened between the left housing and the right housing;

and a bearing supporting the rear portion of the rotor, the bearing radially overlapping the motor.

The power tool according to the present disclosure includes a rear cover that simplifies assembly.

DETAILED DESCRIPTION

Embodiments of the present disclosure will now be described with reference to the drawings.

First Embodiment

Figure 1:
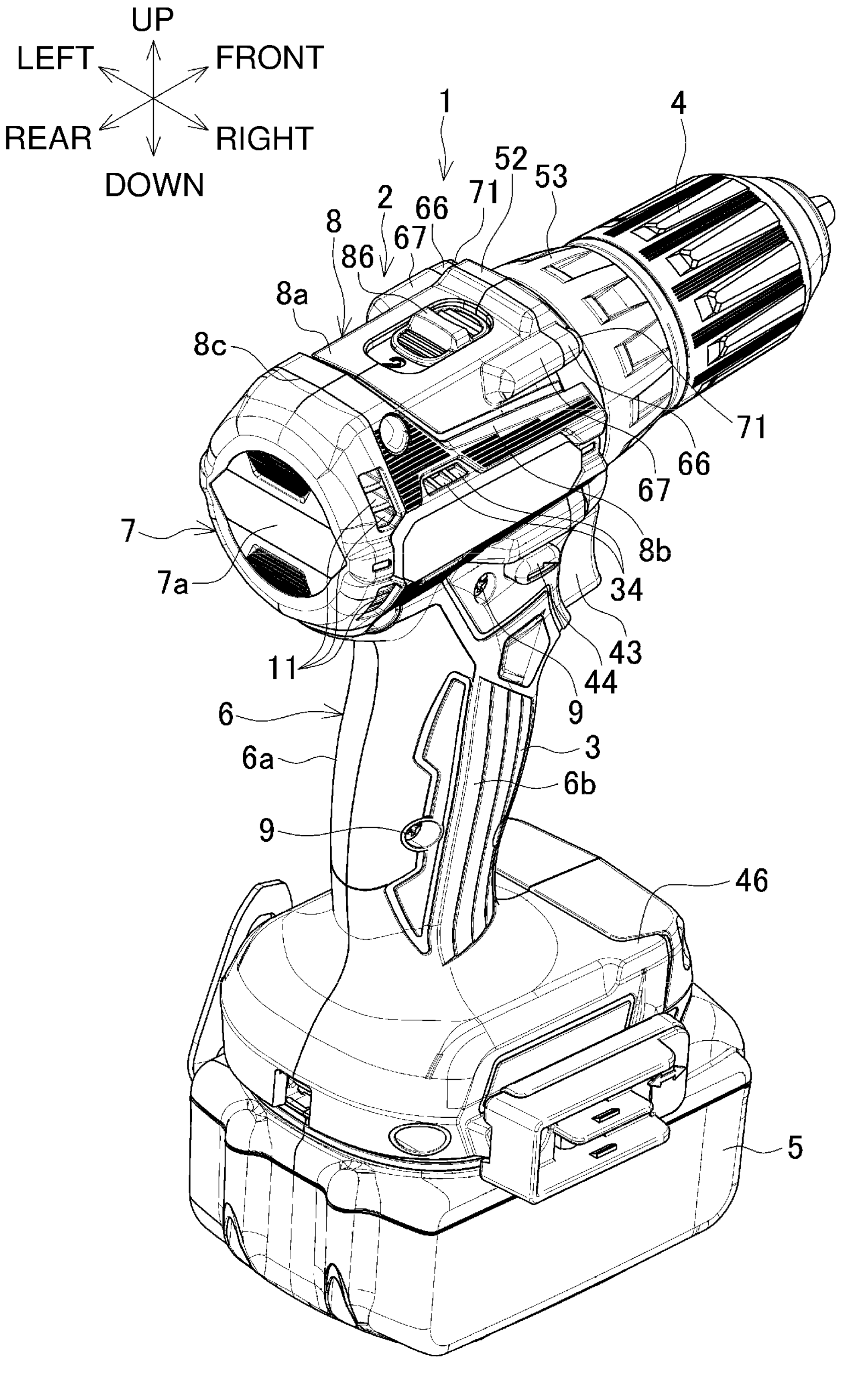
FIG. 1 is a perspective view of a driver drill according to a first embodiment viewed from the rear.
Figure 2:
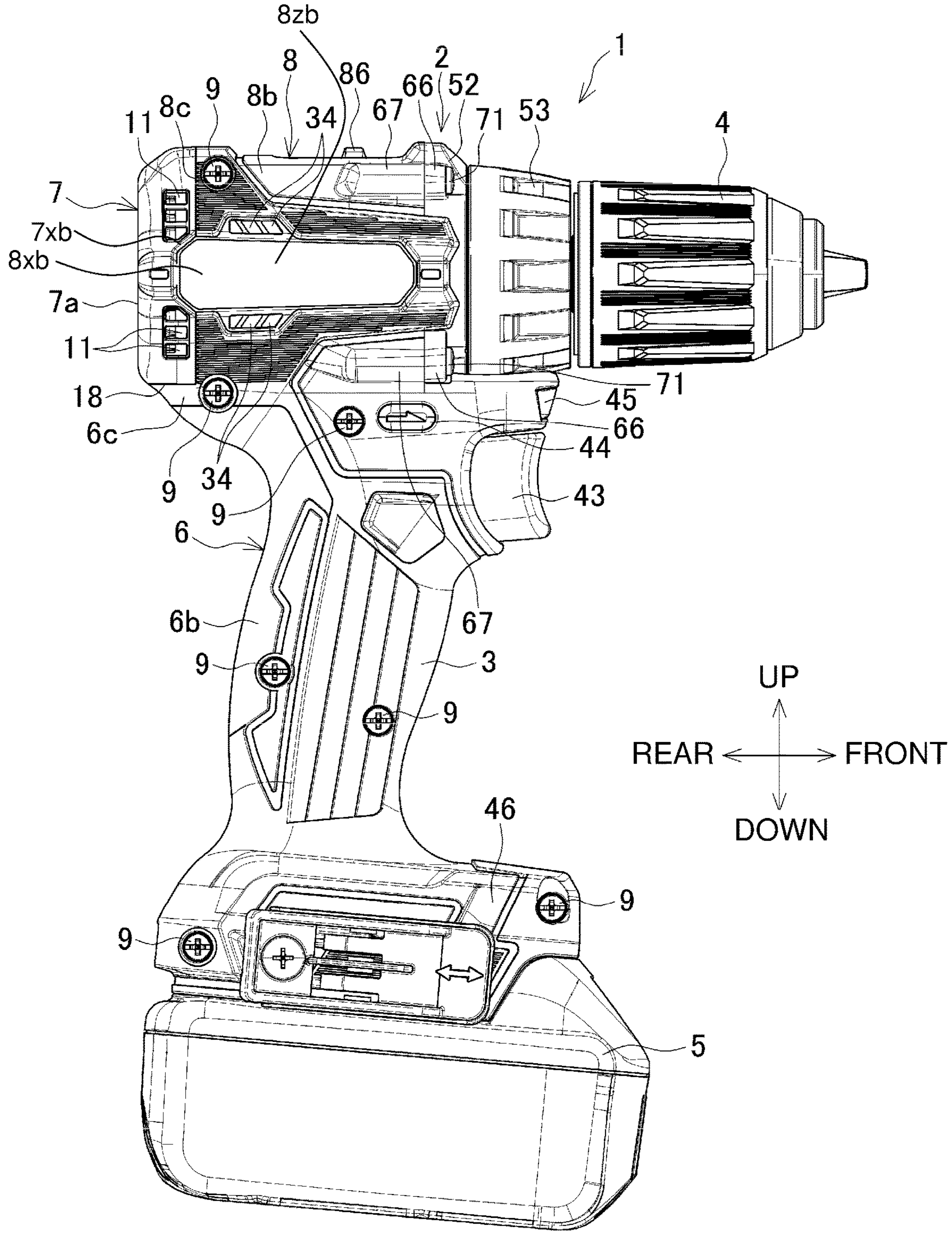
FIG. 2 is a side view of the driver drill according to the first embodiment.
Figure 3:
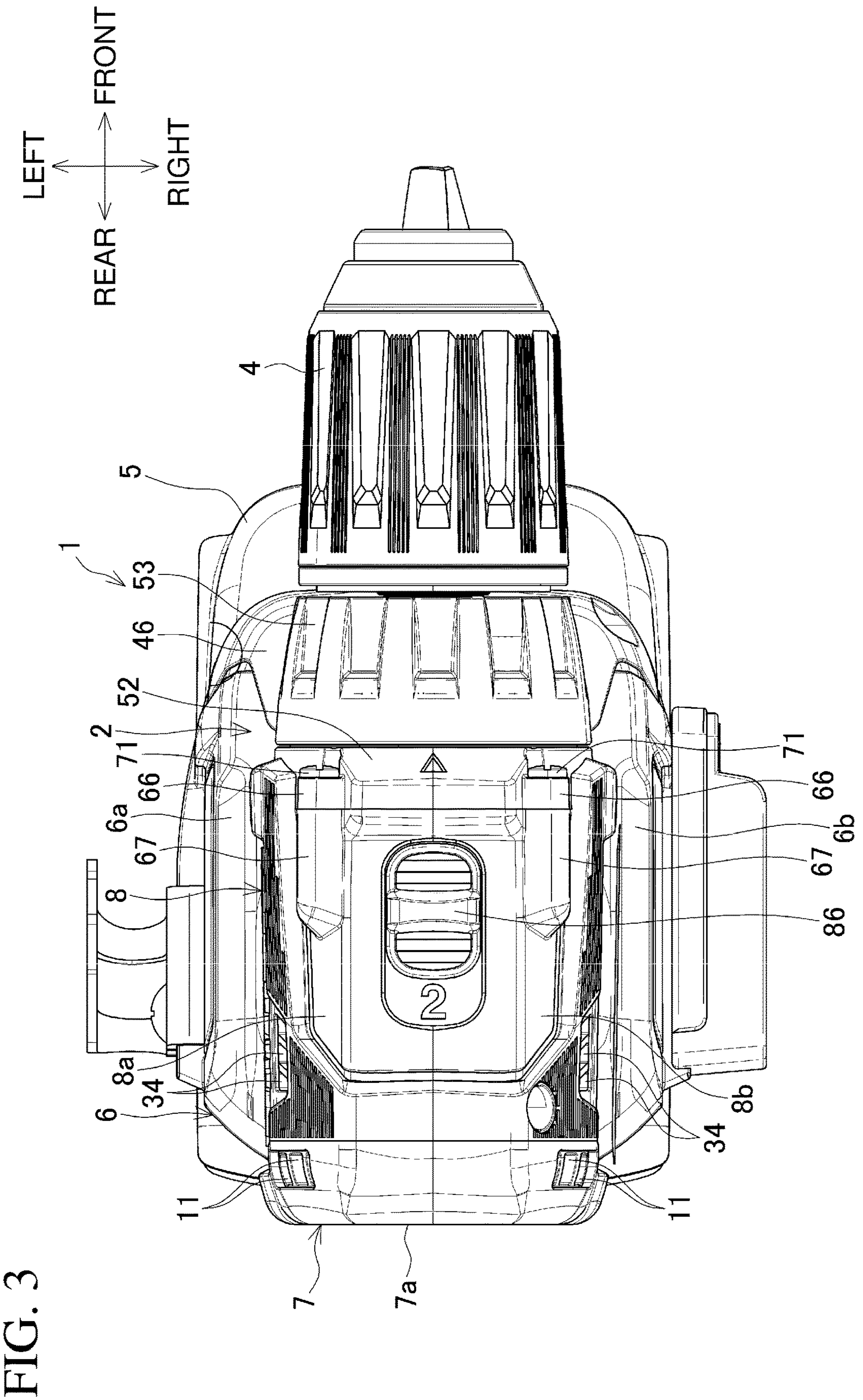
FIG. 3 is a plan view of the driver drill according to the first embodiment.
Figure 4:
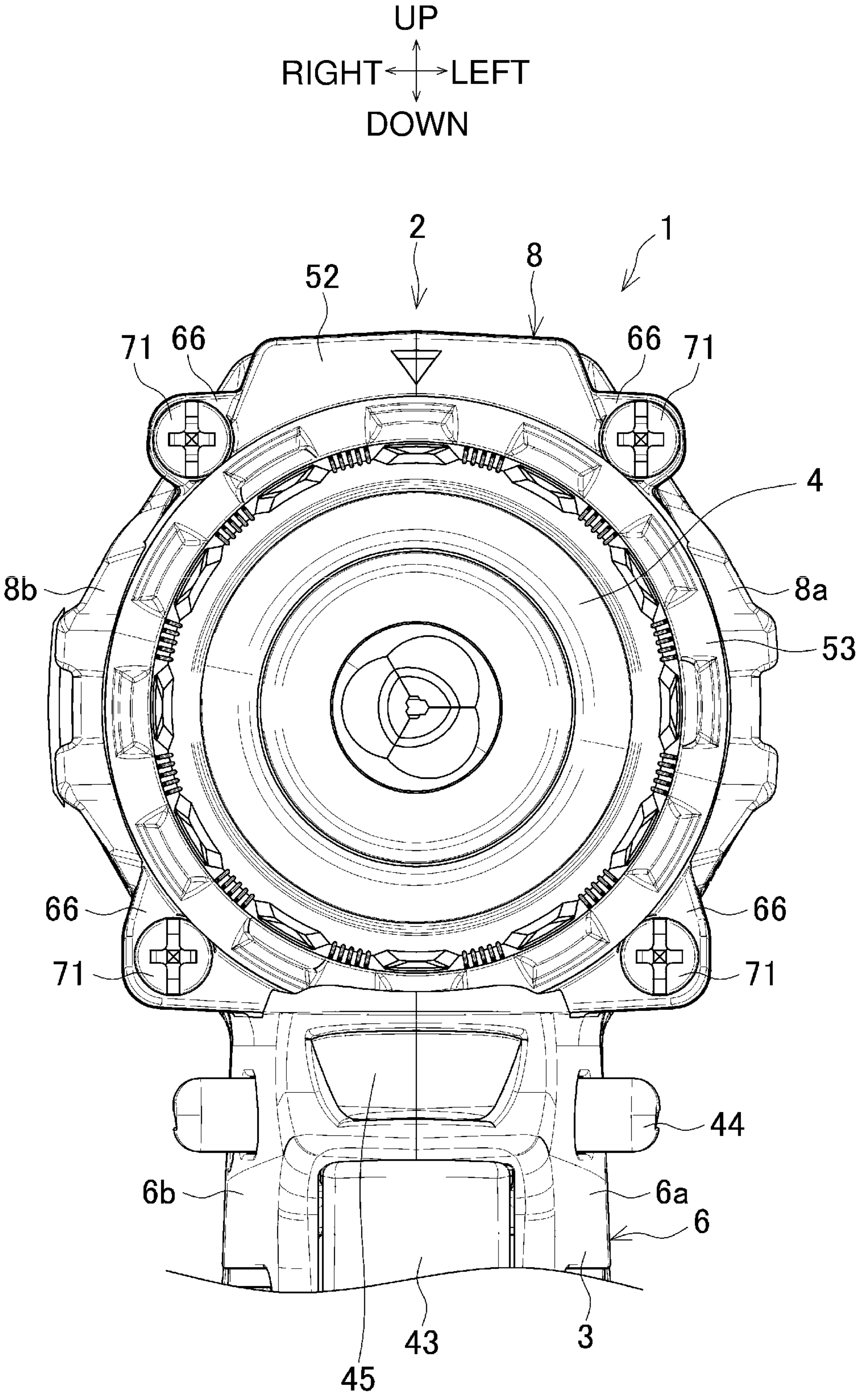
FIG. 4 is a partially enlarged front view of the driver drill according to the first embodiment.
Figure 5:
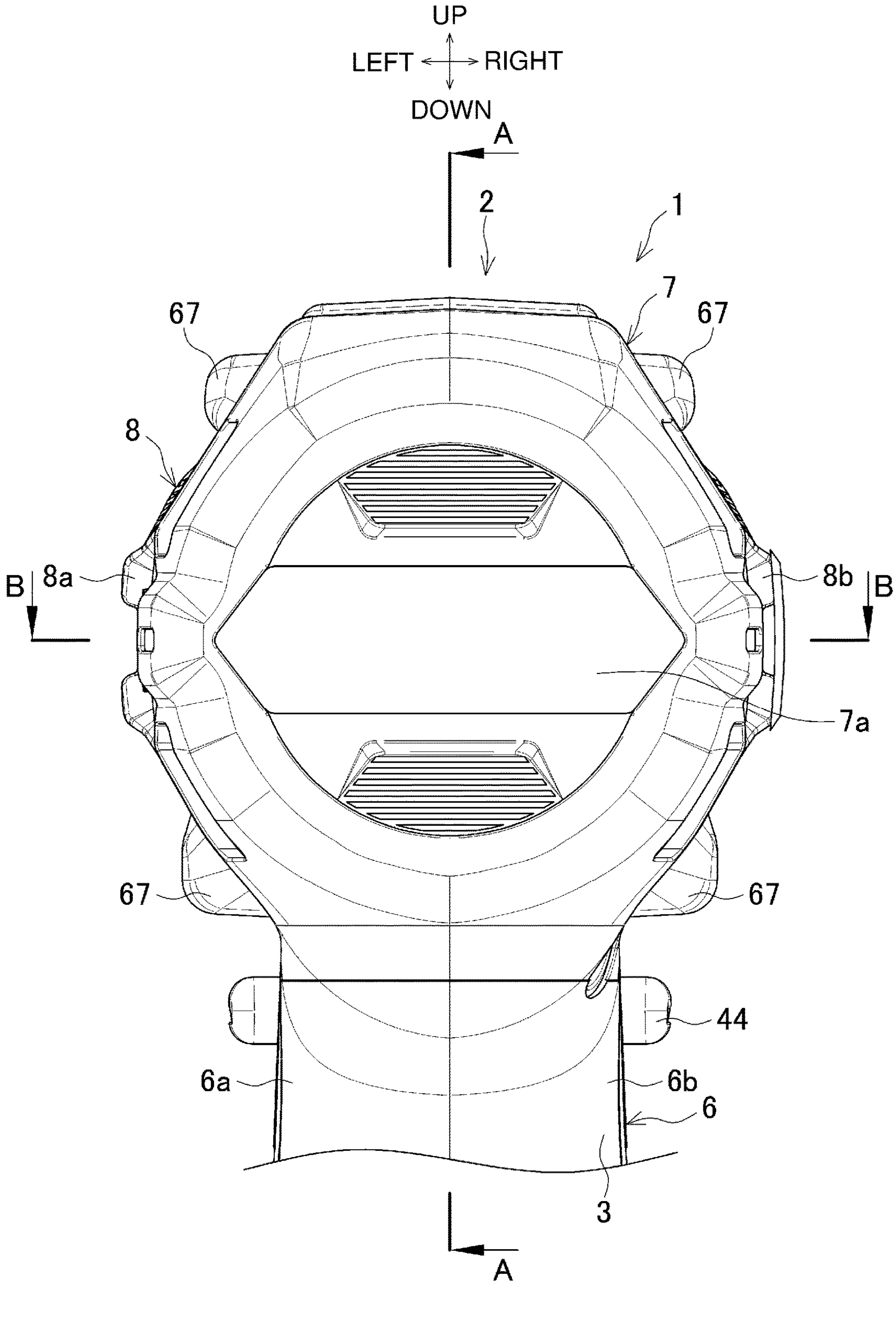
FIG. 5 is a partially enlarged rear view of the driver drill according to the first embodiment.

FIG. 1 is a perspective view of a driver drill as an example of a power tool viewed from the rear. FIG. 2 is a side view of the driver drill. FIG. 3 is a plan view of the driver drill. FIG. 4 is a partially enlarged front view of the driver drill. FIG. 5 is a partially enlarged rear view of the driver drill.

A driver drill is one example of a power tool. The driver drill 1 includes a body 2 and a grip 3. The body 2 extends in the front-rear direction. The grip 3 protrudes from a lower portion of the body 2. The body 2 and the grip 3 form a T shape as viewed laterally (from left side or right side). The body 2 includes a drill chuck 4 on its front end. The drill chuck 4 can receive a driver bit on its distal end.

The grip 3 receives a battery pack 5 as a power supply on its lower end. The driver drill 1 includes a housing including a body housing 6 and a rear cover 7. The body housing 6 includes a cylindrical motor housing 8 and the grip 3 that are connected to each other. The body housing 6 includes left and right housing halves 6*a* and 6*b*. The housing halves 6*a* and 6*b* are fastened together with multiple screws 9 screwed from the right.

Figure 6:
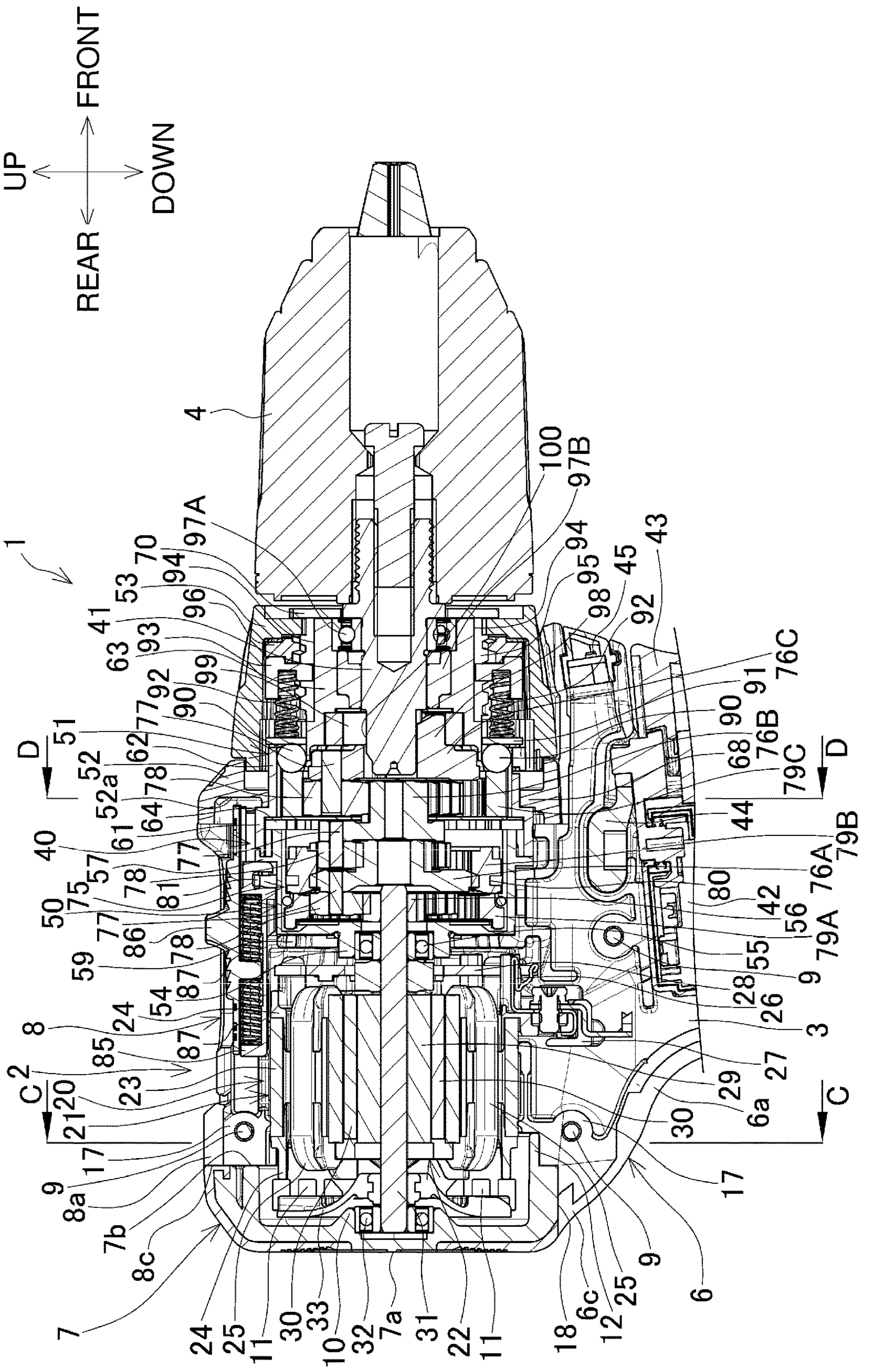
FIG. 6 is a cross-sectional view taken along line A-A in FIG. 5.
Figure 7:
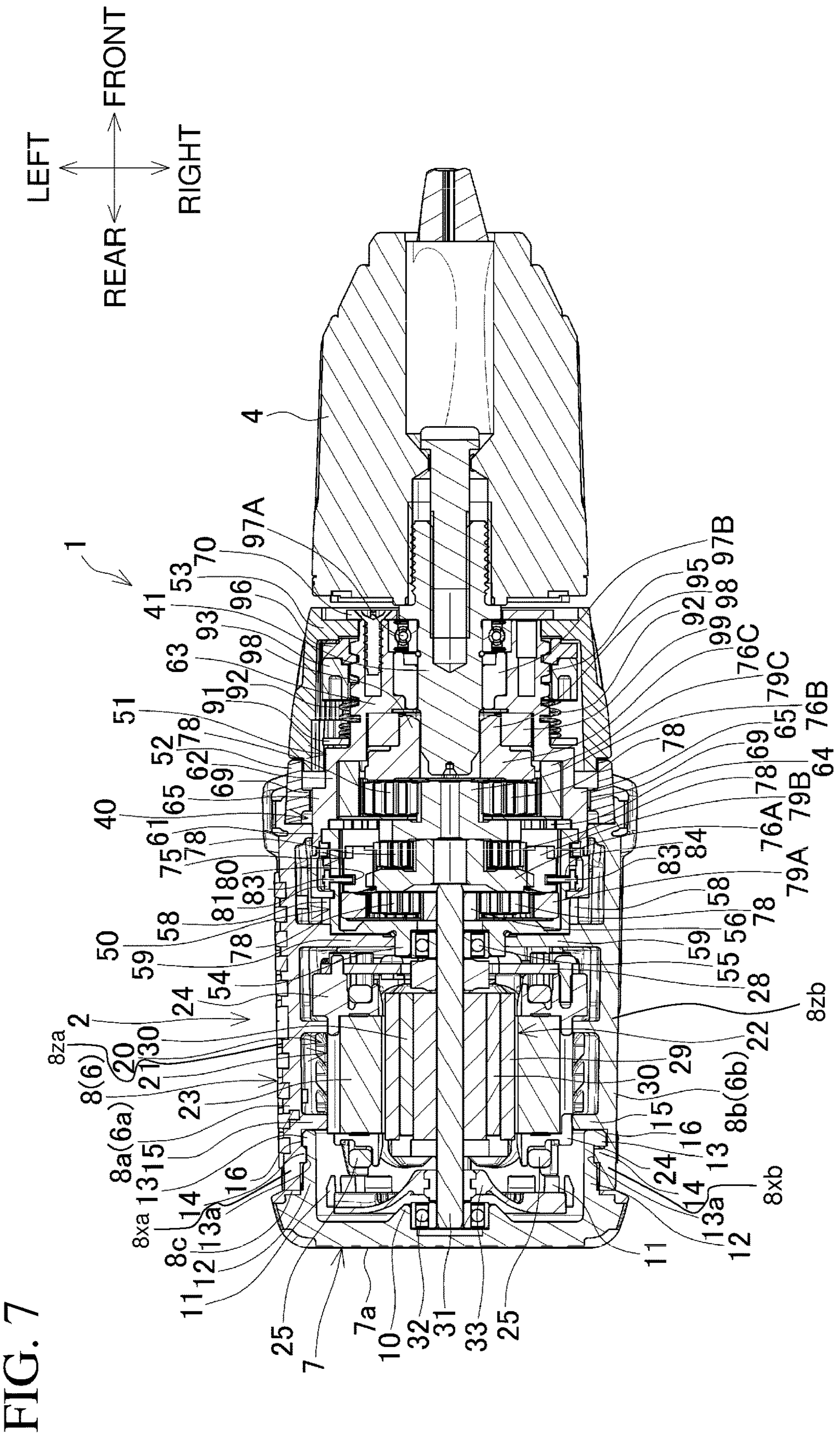
FIG. 7 is a cross-sectional view taken along line B-B in FIG. 5.
Figure 8:
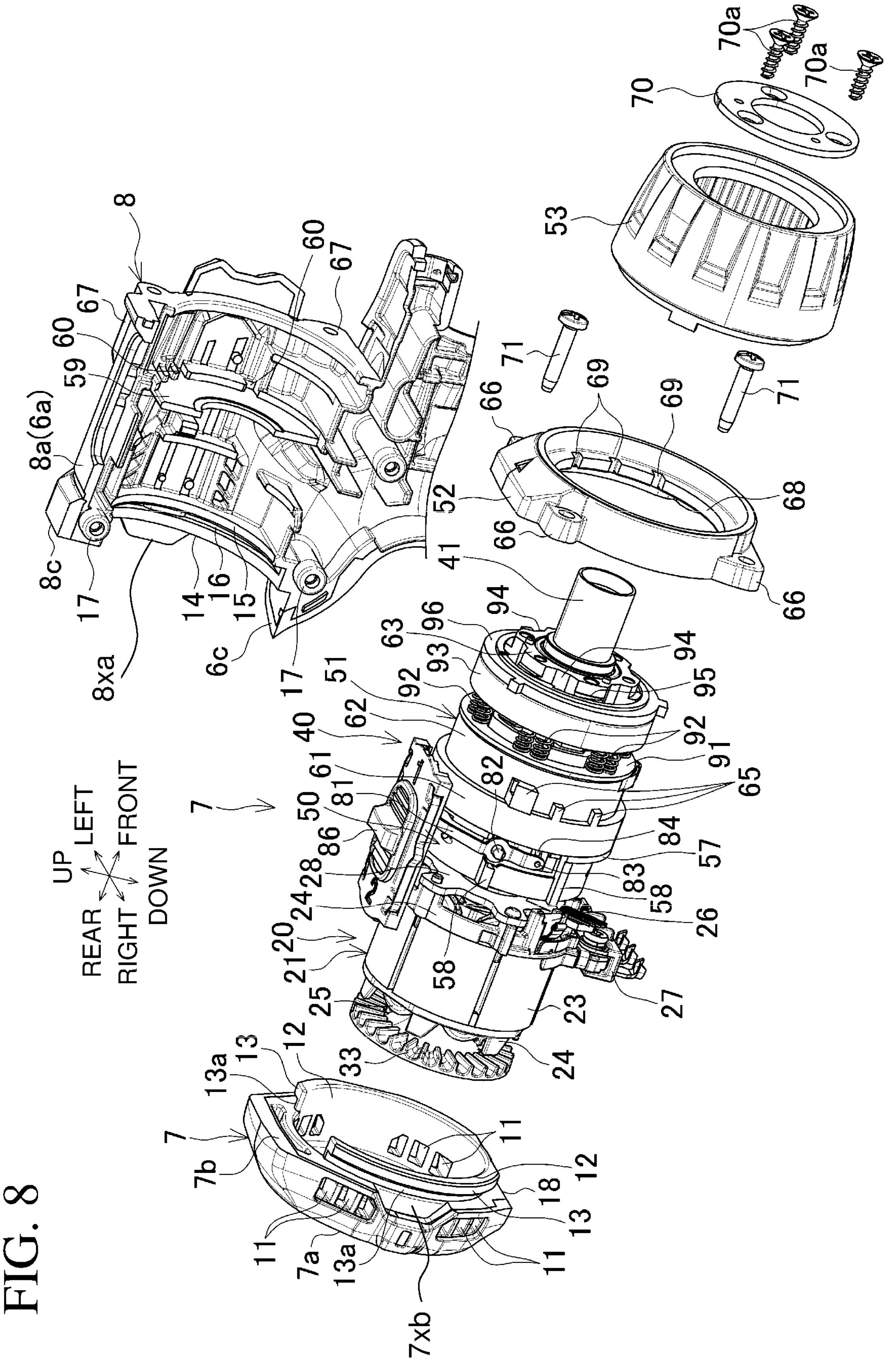
FIG. 8 is an exploded perspective view of a part of a housing and a gear assembly.

The rear cover 7 is a cap having an opening in its front surface. The rear cover 7 has an outer circumference connected continuously with the outer circumference of the motor housing 8. The rear cover 7 has a rear surface 7*a* on a plane defined in vertical and lateral directions. As shown in FIG. 6, the rear cover 7 has, at the center of its inner surface, a circular bearing holder 10 as viewed from the front. The rear cover 7 has multiple outlets 11 in its right and left side surfaces. As shown in FIG. 7, the opening of the rear cover 7 has a pair of connection members 12 on its right and left inner edges. The connection members 12 are located on the left and the right. The pair of connection members 12 are connected to each other in their lower ends. As shown in FIG. 8, each connection member 12, having an arc-shape as viewed from the front, extends frontward. Each connection member 12 has, on its front edge, a ridge 13 raised radially outward. Each connection member 12 has, on its outer circumferential surface, a rectangular groove 13*a* circumferentially located behind the ridge 13.

The motor housing 8 is assembled by fastening a left housing 8*a* and a right housing 8*b* together. The left housing 8*a* is an upper part of the housing half 6*a*. The right housing 8*b* is an upper part of the housing half 6*b*. The left housing 8*a* and the right housing 8*b* are assembled with the connection members 12 on the rear cover 7 between them. The motor housing 8 has a rear end surface 8*c* in its rear portion. The rear end surface 8*c* is orthogonal to the axial direction of the motor housing 8 slightly behind the rearmost screw 9. The body housing 6 has, in its rear portion, an engagement tab 6*c*. As shown in FIG. 6, the engagement tab 6*c* extends rearward from the lower end of the rear end surface 8*c*. The engagement tab 6*c* has its upper surface on a plane defined in the front-rear and lateral directions.

Figure 9:
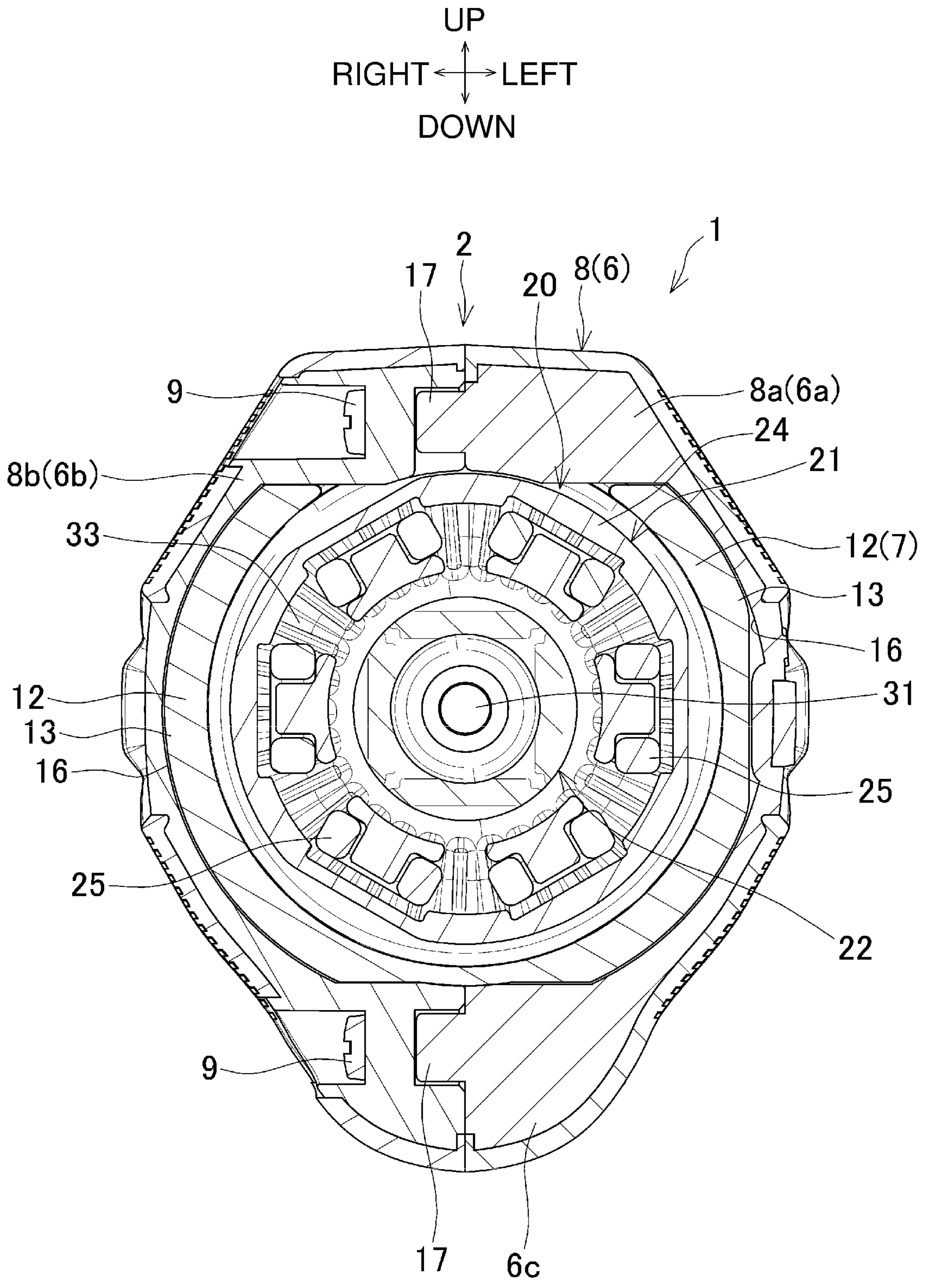
FIG. 9 is an enlarged sectional view taken along line C-C in FIG. 6.

The left housing 8*a* and the right housing 8*b* have rear ribs 14, front ribs 15, and engagement grooves 16 on the right and left inner surfaces of their rear ends. As shown in FIG. 8, the rear ribs 14, the front ribs 15, and the engagement grooves 16 are semicircular as viewed from the front. The rear rib 14 extends radially inward. The front rib 15 extends radially inward. The engagement groove 16 is recessed radially inward. The rear ribs 14 are engaged with the rectangular grooves 13*a* behind the ridges 13 on the connection members 12. The rectangular groove 13*a* is recessed radially outward. The ridge 13 extends radially outward. The front ribs 15 receive the front surfaces of the connection members 12, and hold a stator 21 described later. As shown in FIG. 9, the engagement grooves 16 are located between the rear ribs 14 and the front ribs 15, and engaged with the ridges 13 on the connection members 12.

The ridges 13 on the connection members 12 are engaged with the respective engagement grooves 16. In a manner opposite to this, the rear ribs 14 are engaged with the respective rectangular grooves 13*a*. This prevents the rear cover 7 from slipping off rearward. In this state, the rear cover 7 is held and fastened between the left and right housings 8*a* and 8*b* fastened together with the screws 9. The rearmost screws 9 are screwed into screw bosses 17 in the left housing 8*a*. As shown in FIGS. 6 and 9, the screw bosses 17 are located above and below the connection members 12. The connection members 12 are thus laterally held, reliably preventing the rear cover 7 from slipping off. The rear cover 7 has, on its front surface, a relief part 7*b* above the connection members 12. The relief part 7*b* avoids contact between the rear cover 7 and the screw boss 17.

The rear cover 7 has a flat surface 18 in its lower surface. The flat surface 18 is in contact with the engagement tab 6*c* with the rear cover 7 fastened. The rear cover 7 is thus connected continuously with the motor housing 8 and the engagement tab 6*c*.

The rear cover 7 has recesses on its right and left front portions. The rear cover has a left recess 7*xa* on the left. The rear cover has a right recess 7*xb* on the right. The left recess 7*xa* and the right recess 7*xb* are substantially trapezoidal.

The left housing 8*a* has a left rear protrusion 8*xa* in its upper rear portion. The right housing 8*b* has a right rear protrusion 8*xb* in its upper rear portion. The left rear protrusion 8*xa* and the right rear protrusion 8*xb* are substantially trapezoidal.

The left recess 7*xa* is fitted with the left rear protrusion 8*xa*. The right recess 7*xb* is fitted with the right rear protrusion 8*xb*.

The left housing 8*a* has, on its upper portion, a logotype display 8*za* having the left rear protrusion 8*xa* in its rear portion. The right housing 8*b* has, on its upper portion, a product information labelling portion 8*zb* having the right rear protrusion 8*xb* in its rear portion. The left recess 7*xa* and the left rear protrusion 8*xa* are located between the upper and lower outlets 11 in the left housing 8*a*. The right recess 7*xb* and the right rear protrusion 8*xb* are located between the upper and lower outlets 11 in the right housing 8*b*.

The motor housing 8 in the rear portion of the body 2 accommodates a brushless motor 20. The brushless motor 20 is an inner-rotor motor including the stator 21 and a rotor 22. The rotor 22 is located inside the stator 21. The stator 21 includes a stator core 23, front and rear insulators 24, and multiple coils 25. The coils 25 are wound around the stator core 23 with the front and rear insulators 24 between them. The front insulator 24 holds three fuse terminals 26 on its lower portion. Each fuse terminal 26 is fused to the coil 25 in the corresponding phase. The fuse terminals 26 form a three-phase connection. The fuse terminals 26 receive connectors 27 fastened by screwing from below. The connectors 27 are connected to a controller (described later) with lead wires.

A sensor circuit board 28 is attached to the front end of the front insulator 24. The sensor circuit board 28 includes rotation detecting elements to detect magnetic fields of permanent magnets 30 (described later).

The rotor 22 includes a rotor core 29 and the four permanent magnets 30. A rotational shaft 31 is fixed along the axis of the rotor core 29. The permanent magnets 30 are embedded in through-holes in the rotor core 29. The rotational shaft 31 has its rear end axially supported by a bearing 32, which is held on the bearing holder 10 in the rear cover 7. A fan 33 is located in front of the bearing 32 and behind the rotor core 29. The fan 33 is a centrifugal fan fixed on the rotational shaft 31. The fan 33 and the bearing 32 overlap each other in the radial direction of the bearing 32. The motor housing 8 has multiple inlets 34 (FIGS. 1 and 2) in its right and left side surfaces and rightward and leftward from the stator 21.

The brushless motor 20 has its front assembled with a gear assembly 40. The gear assembly 40 includes a spindle 41 protruding frontward from a second gear case 51 (described later). The drill chuck 4 is attached to the front end of the spindle 41. Below the gear assembly 40, the grip 3 accommodates a switch 42 in its upper portion. The switch 42 has its front connected to a trigger 43. Above the switch 42, a forward-reverse switch button 44 to switch the rotation direction of the brushless motor 20 is located. In front of the forward-reverse switch button 44, a lamp 45 is located to illuminate ahead of the drill chuck 4.

The grip 3 has a battery mount 46 on its lower end. The battery pack 5 is installed on the battery mount 46 in a manner slidable from the front. The battery mount 46 accommodates a terminal mount and the controller (not shown). The controller includes a control circuit board including, for example, a microcomputer and switching elements to control the brushless motor 20.

The gear assembly 40 includes a cylindrical first gear case 50, a cylindrical second gear case 51, a gear cover ring 52, and a clutch adjustment ring 53. The first gear case 50, the second gear case 51, and the clutch adjustment ring 53 are formed from resin. The gear cover ring 52 is formed from metal such as an aluminum alloy. The clutch adjustment ring 53 allows switching to a drill mode.

The first gear case 50 has a bearing holder 54 at the center of its rear end. The bearing holder 54 holds a bearing 55 supporting a front portion of the rotational shaft 31. The rotational shaft 31 protrudes into the first gear case 50. The rotational shaft 31 receives a pinion 56 on its front end.

The first gear case 50 has a flange 57 on its front outer circumference. The first gear case 50 has a pair of an upper and a lower first ribs 58 raised on the right and left behind the flange 57. As shown in FIGS. 7 and 8, the first ribs 58 extend in the front-rear direction. The motor housing 8 has semicircular receiving ribs 59 on its right and left inner surfaces. The receiving ribs 59 receive the rear surface of the first gear case 50 excluding the bearing holder 54. Each receiving rib 59 has a thicker front outer circumference than a front inner circumference. Each receiving rib 59 has, in its thicker portion, first grooves 60 engaged with the first ribs 58. The first ribs 58 and the first grooves 60 engaged with each other restrict rotation of the first gear case 50 in the motor housing 8.

The second gear case 51 is a multistage cylinder including a larger-diameter portion 61, a medium-diameter portion 62, and a smaller-diameter portion 63 that are coaxially arranged in this order from the rear. The larger-diameter portion 61 covers the front end of the first gear case 50. The larger-diameter portion 61 has its rear end engaged with the flange 57. The larger-diameter portion 61 and the first gear case 50 hold an engagement ring 64 between them. The medium-diameter portion 62 has three second ribs 65 on each of its right and left in front of the larger-diameter portion 61. As shown in FIGS. 7 and 8, the three second ribs 65 protrude frontward at circumferentially predetermined intervals.

The gear cover ring 52 is a ring in contact with the front end of the motor housing 8 from the front. As shown in FIG. 4, the gear cover ring 52 has four screwing portions 66 raised from the outer circumference and arranged circumferentially at intervals. The two upper screwing portions 66 are located closer to each other in the lateral direction than the two lower screwing portions 66. Each screwing portion 66 protrudes outward from the clutch adjustment ring 53 as viewed from the front. As shown in FIGS. 1 to 3, the motor housing 8 has screw bosses 67 on its outer circumference. Each screw boss 67 is located behind the corresponding screwing portion 66.

Figure 10:
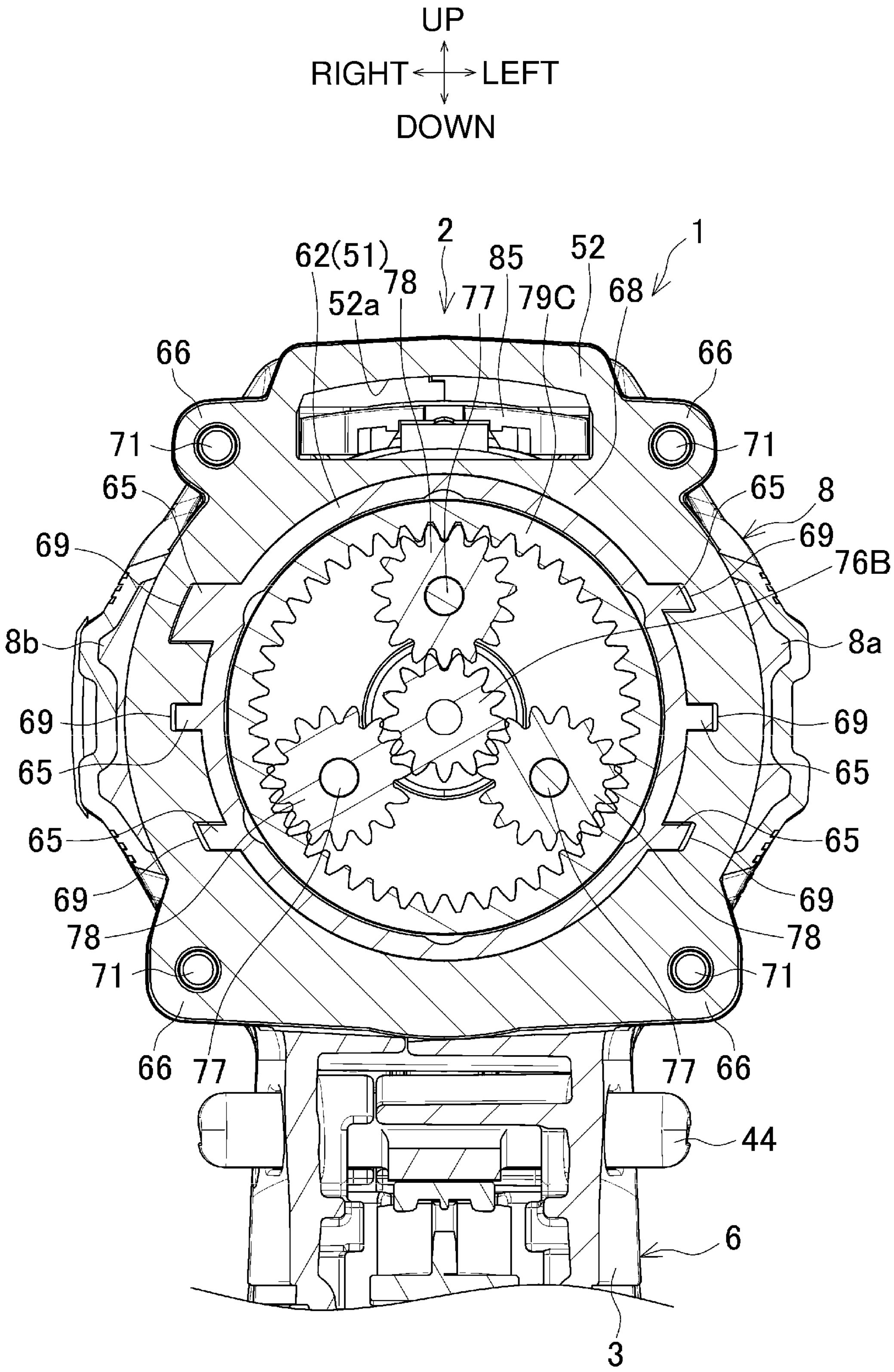
FIG. 10 is an enlarged sectional view taken along line D-D in FIG. 6.
Figure 11:
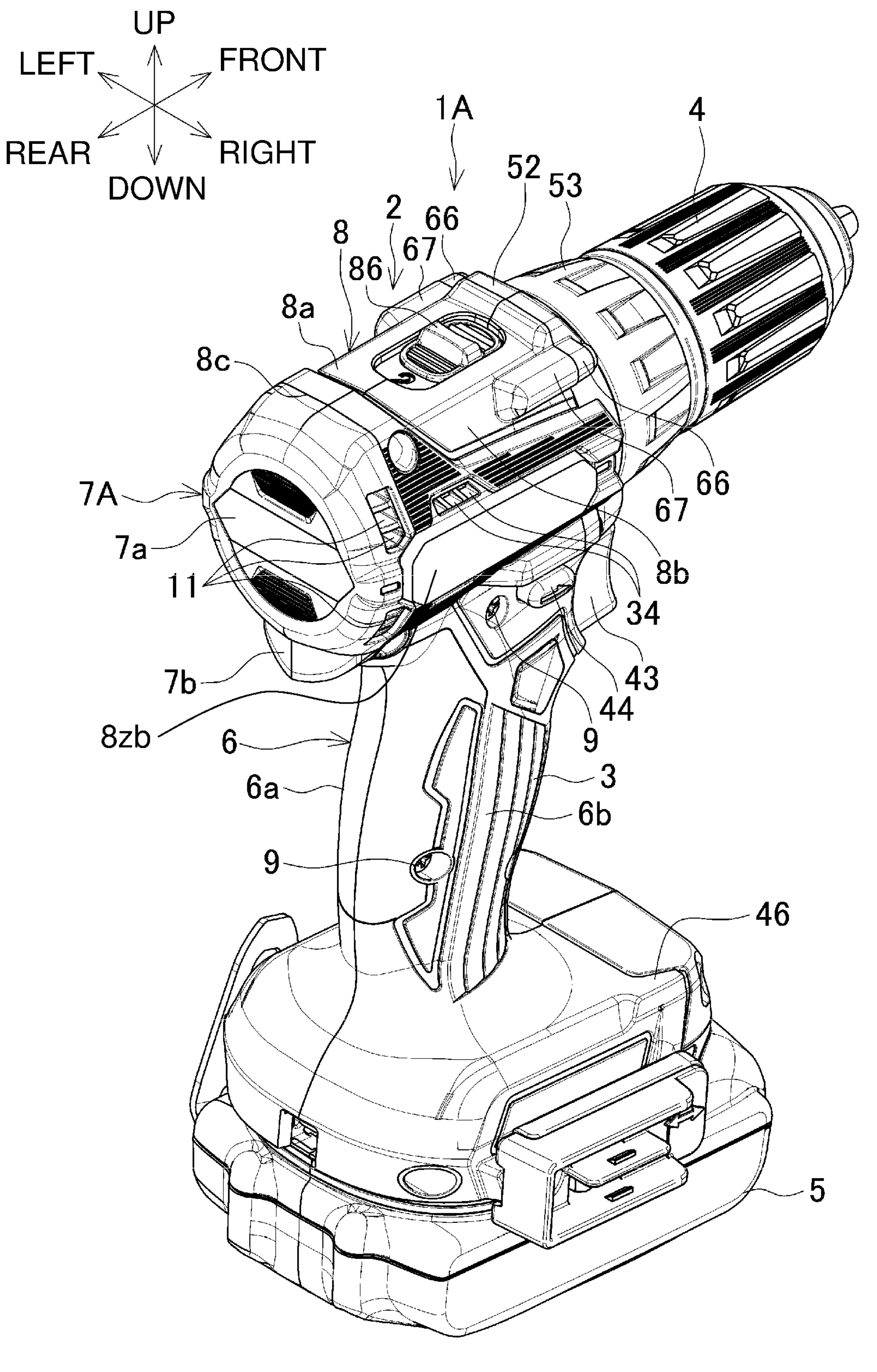
FIG. 11 is a perspective view of a driver drill according to a second embodiment viewed from the rear.
Figure 12:
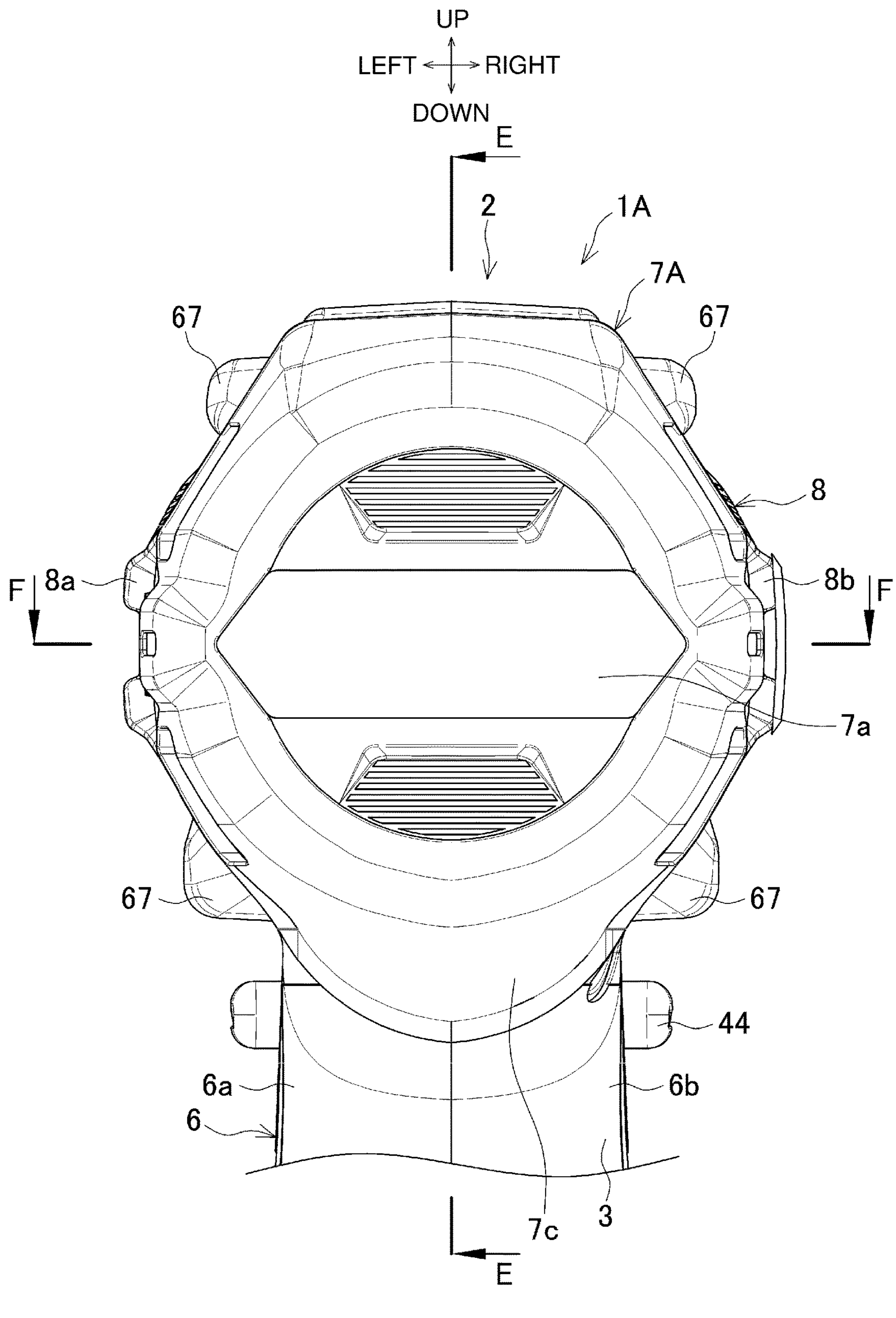
FIG. 12 is a partially enlarged rear view of the driver drill according to the second embodiment.
Figure 13:
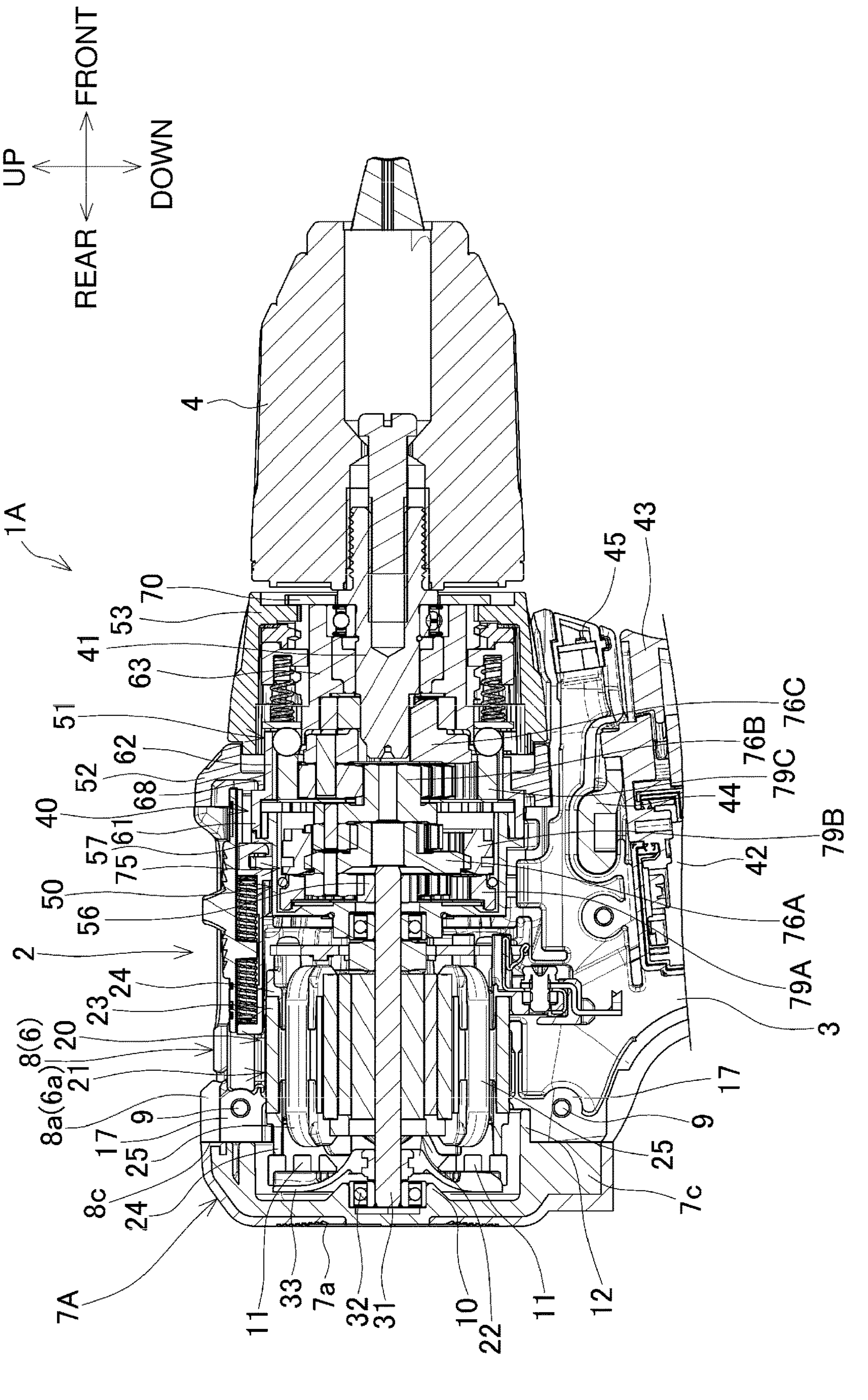
FIG. 13 is a cross-sectional view taken along line E-E in FIG. 12.
Figure 14:
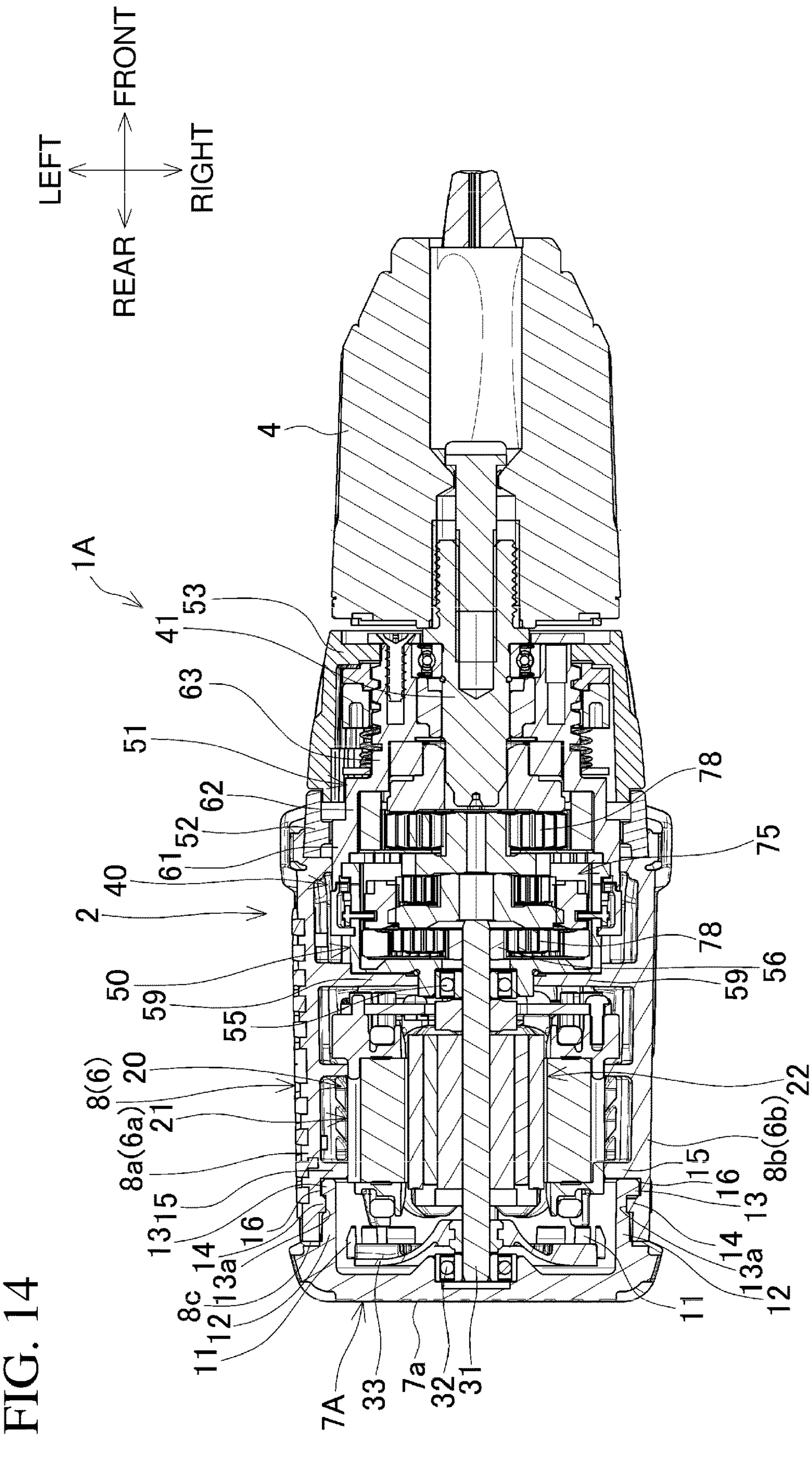
FIG. 14 is a cross-sectional view taken along line F-F in FIG. 12.
Figure 15:
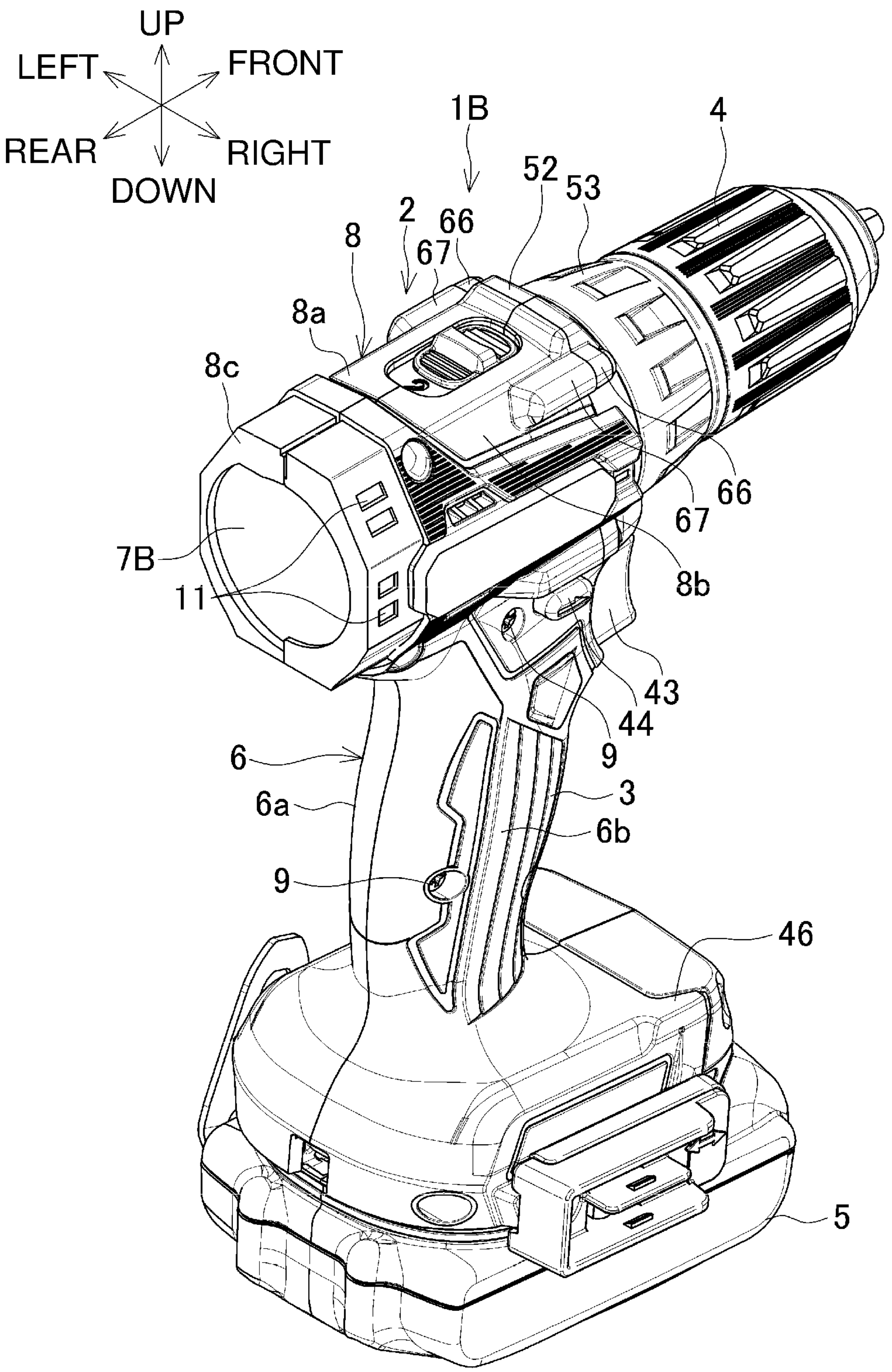
FIG. 15 is a perspective view of a driver drill according to a third embodiment viewed from the rear.
Figure 16:
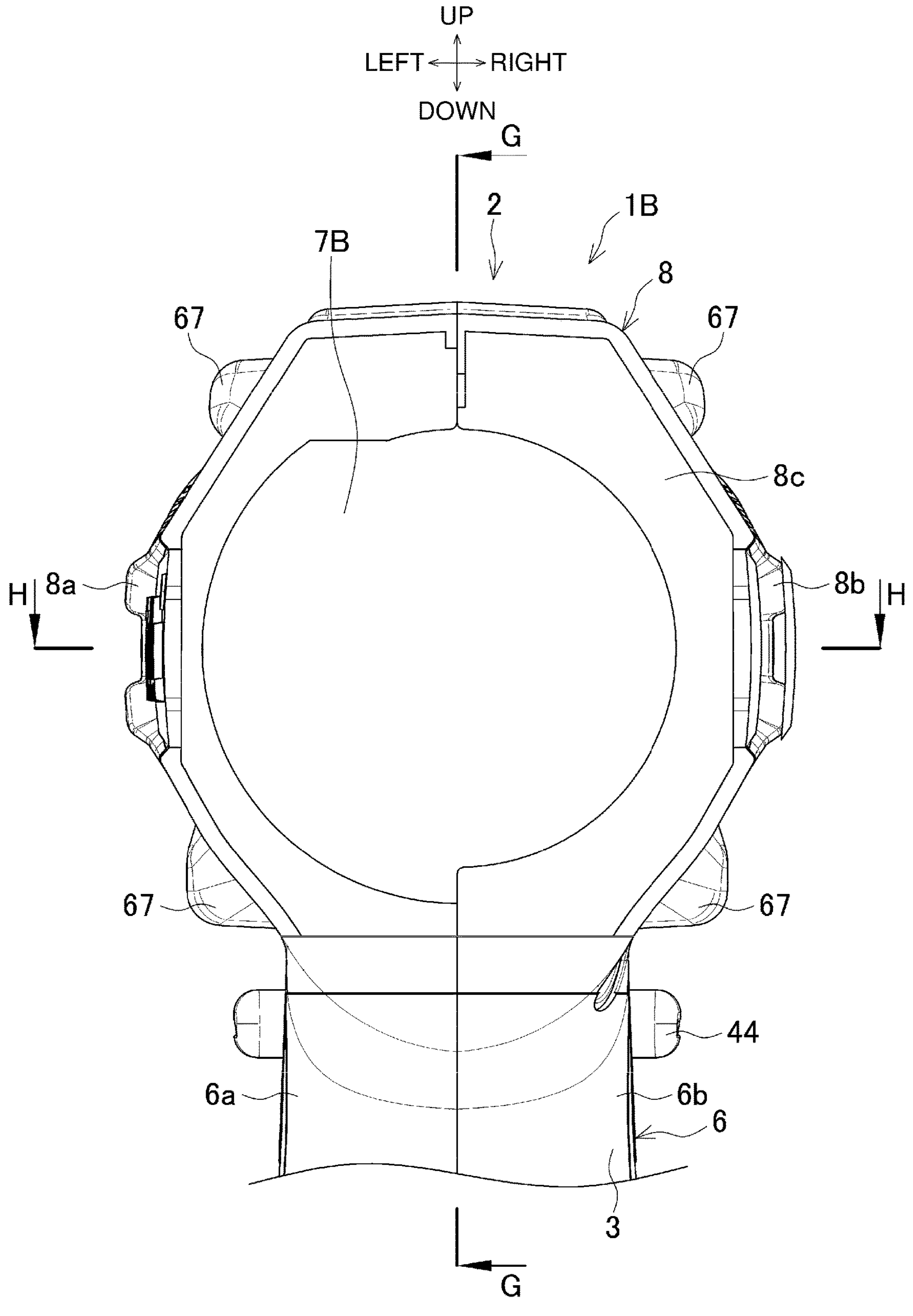
FIG. 16 is a partially enlarged rear view of the driver drill according to the third embodiment.
Figure 17:
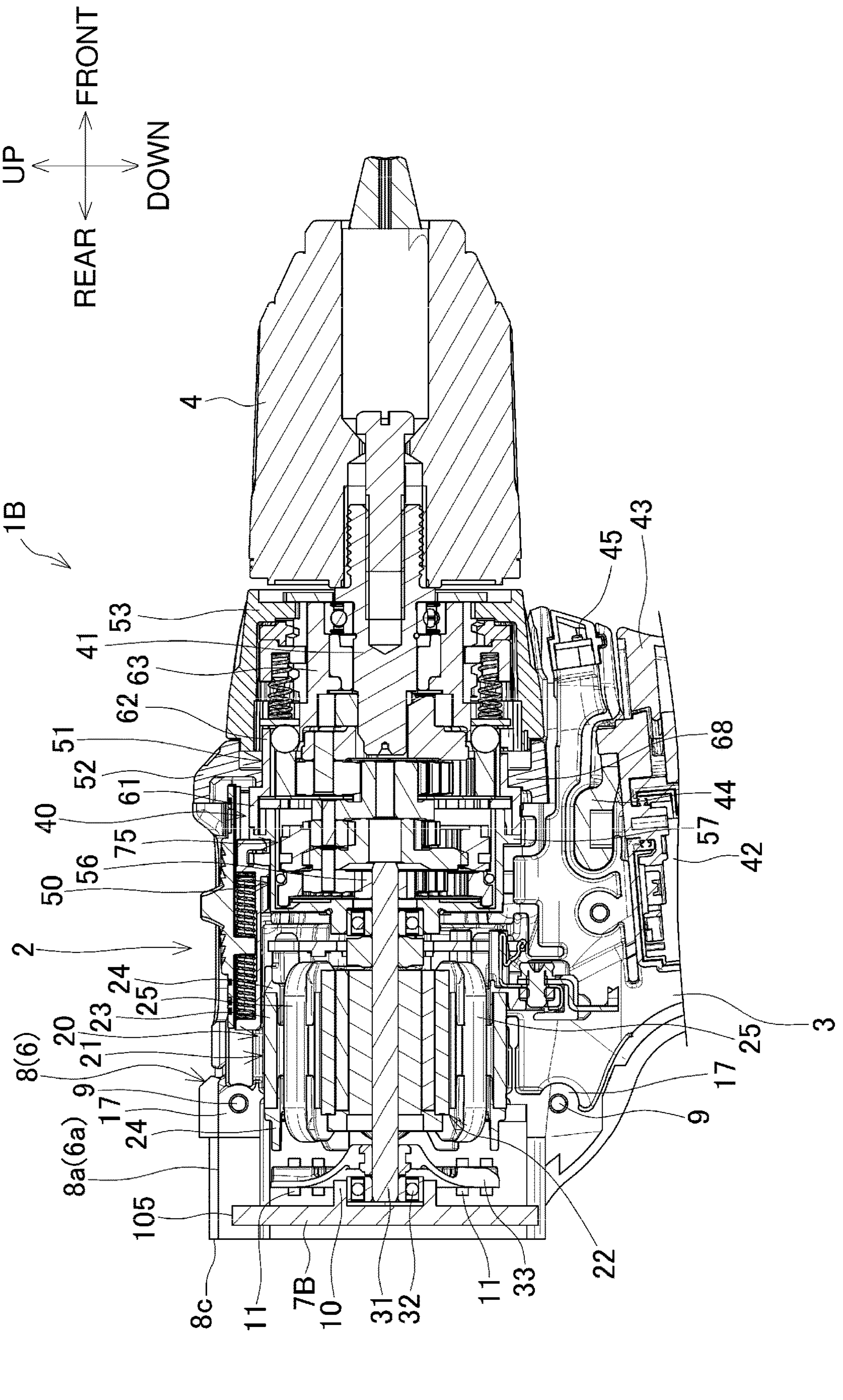
FIG. 17 is a cross-sectional view taken along line G-G in FIG. 16.
Figure 18:
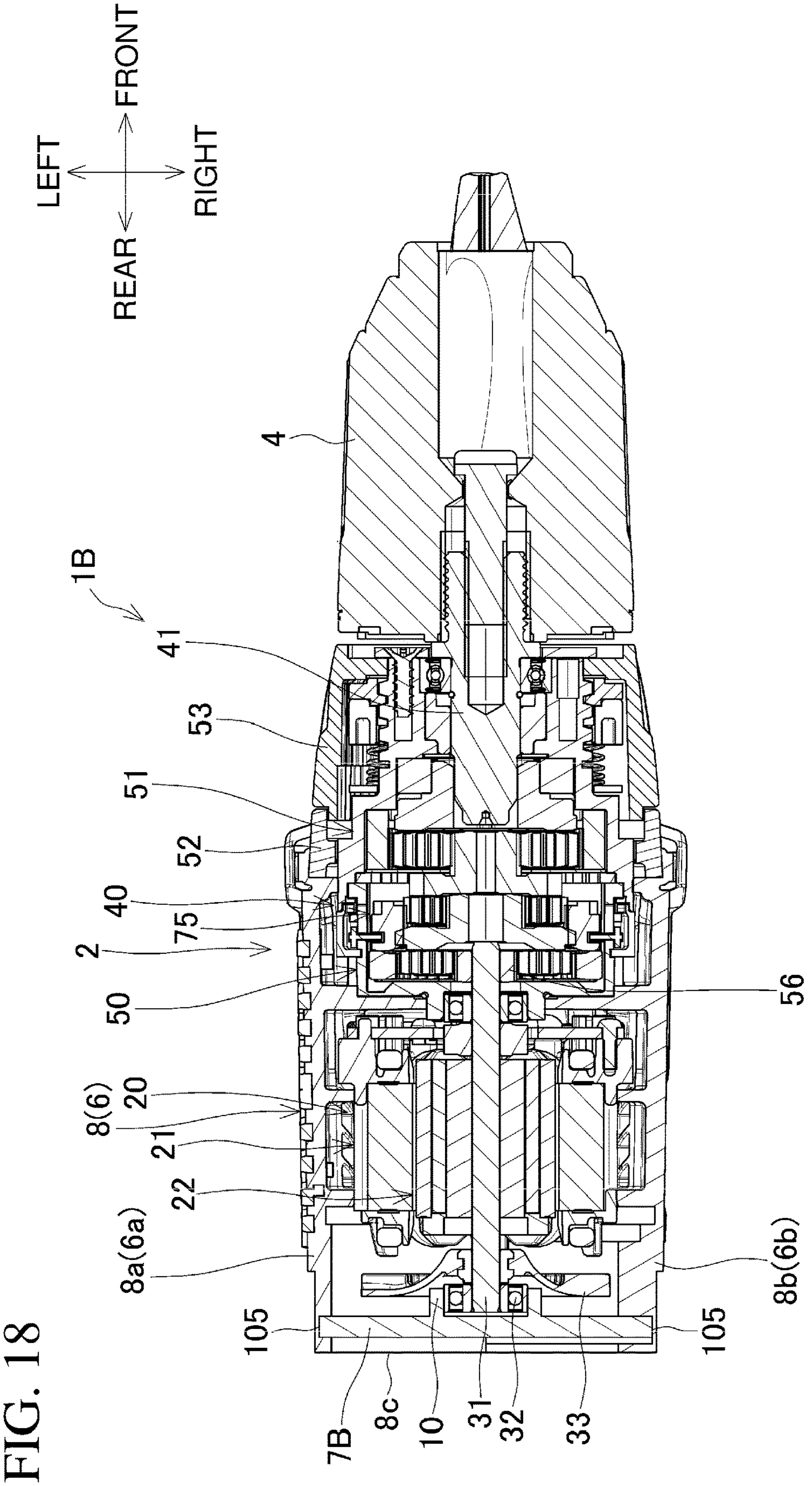
FIG. 18 is a cross-sectional view taken along line H-H in FIG. 16.

The gear cover ring 52 has a ring protruding edge 68 on its inner circumference. The protruding edge 68 protrudes toward the center of the motor housing 8 beyond the front end of the motor housing 8. The protruding edge 68 is in contact with the front surface of the larger-diameter portion 61 of the second gear case 51. As shown in FIG. 8, the protruding edge 68 has three second grooves 69 on the right and on the left. As shown in FIG. 10, the second grooves 69 are engaged with the second ribs 65 on the second gear case 51. The second ribs 65 and the second grooves 69 engaged with each other restrict rotation of the second gear case 51.

The clutch adjustment ring 53 is cylindrical, and has a rear end covering the medium-diameter portion 62 of the second gear case 51. The rear end of the clutch adjustment ring 53 faces the front end of the gear cover ring 52. The clutch adjustment ring 53 and the gear cover ring 52 may be in contact with each other. The smaller-diameter portion 63 of the second gear case 51 receives, on its front end, a pressing plate 70 fastened with three screws 70*a*. The pressing plate 70 positions the clutch adjustment ring 53 from the front. The clutch adjustment ring 53 is thus rotatably held between the gear cover ring 52 and the pressing plate 70.

Each screwing portion 66 in the gear cover ring 52 receives a screw 71 that is placed through it from the front. Each screw 71 placed through the corresponding screwing portion 66 is screwed into the corresponding screw boss 67 in the motor housing 8. The gear assembly 40 is thus fastened to the motor housing 8. In this state, the protruding edge 68 of the gear cover ring 52 presses, rearward, the larger-diameter portion 61 of the second gear case 51. The larger-diameter portion 61 is thus pressed against the flange 57 on the first gear case 50. The first gear case 50 is thus pressed rearward through the flange 57 to come in contact with the receiving ribs 59, and is axially positioned.

In this structure, the gear cover ring 52 is screwed to be closer to the receiving ribs 59. This causes the second gear case 51 to come in close contact with the first gear case 50.

The gear assembly 40 includes a reducing mechanism 75. The reducing mechanism 75 includes three carriers 76A to 76C that are axially aligned in a stepwise manner. The carrier 76A supports three planetary gears 78 through the corresponding pins 77. The carrier 76B also supports three planetary gears 78 through the corresponding pins 77. The carrier 76C also supports three planetary gears 78 through the corresponding pins 77.

The planetary gears 78 in each stage move in planetary motion inside internal gears 79A to 79C. The planetary gears 78 in a first stage mesh with the pinion 56 on the rotational shaft 31. The internal gear 79B in a second stage is rotatable and movable in the front-rear direction inside the first gear case 50. At an advanced position, the internal gear 79B meshes with the planetary gear 78 in the second stage and is engaged with the engagement ring 64. The internal gear 79B is thus nonrotatable. At a retracted position, the internal gear 79B simultaneously meshes with the planetary gear 78 in the second stage and the carrier 76A in the first stage. The internal gear 79B is thus rotatable. The internal gear 79B has a ring groove 80 on its entire outer circumference.

The first gear case 50 has, on its upper outer circumference, a semicircular leaf spring 81 as viewed from the front. As shown in FIG. 8, the leaf spring 81 has right and left middle portions to receive support pins 82 protruding from the right and left side surfaces of the first gear case 50. The leaf spring 81 is thus swingable about the support pins 82 in the front-rear direction. The leaf spring 81 has engagement pins 83 on its right and left lower ends. The engagement pins 83 extend through arch-shaped guide holes 84 in the right and left of the first gear case 50 below the support pins 82. The engagement pins 83 are engaged with the ring groove 80 in the internal gear 79B through the guide holes 84. The center of the upper end of the leaf spring 81 is engaged with the front lower surface of a slider 85. The slider 85 is located movably in the front-rear direction above the first gear case 50. The slider 85 has its upper surface connected to a speed switch lever 86 with front and rear coil springs 87 between them. The speed switch lever 86 is supported movably in the front-rear direction on the upper surface of the motor housing 8. The gear cover ring 52 has a recess 52*a* (FIGS. 6 and 10) on its upper rear portion. The recess 52*a* allows the slider 85 and the speed switch lever 86 to slide forward.

In response to the speed switch lever 86 being slid forward, the slider 85 moves forward. The leaf spring 81 then has its upper center moving forward, and its right and left lower ends swinging rearward about the support pins 82. The internal gear 79B thus moves to the retracted position through the engagement pins 83. This state refers to a high speed mode (second speed) in which the planetary gear 78 in the second stage and the carrier 76A in the first stage rotate together via the internal gear 79B to cancel speed reduction in the second stage.

In response to the speed switch lever 86 being slid rearward, the slider 85 moves rearward. The leaf spring 81 then has its upper center moving rearward, and its right and left lower ends swinging forward about the support pins 82. The internal gear 79B thus moves to the advanced position through the engagement pins 83. This state refers to a low speed mode (first speed) in which the engagement ring 64 restricts rotation of the internal gear 79B, performing speed reduction in the second stage.

The internal gear 79C in a third stage is rotatable inside the medium-diameter portion 62 of the second gear case 51. The medium-diameter portion 62 holds multiple balls 90 in contact with the front surface of the internal gear 79C. Each ball 90 engages with an engagement projection (not shown) on the front surface of the internal gear 79C in the rotation direction. Each ball 90 is urged rearward by multiple coil springs 92 through a washer 91. Each coil spring 92 has its front end held in a receiving ring 93 externally mounted on the smaller-diameter portion 63 of the second gear case 51. The receiving ring 93 engages with multiple grooves 94 in the front-rear direction on the outer circumference of the smaller-diameter portion 63, and thus is nonrotatable. The receiving ring 93 is movable in the front-rear direction alone.

A feeding ring 96 is located in front of the receiving ring 93. The feeding ring 96 is screwed into screw portions 95 on the outer circumference of the smaller-diameter portion 63. The outer circumference of the feeding ring 96 engages with the inner circumference of the clutch adjustment ring 53. In response to the clutch adjustment ring 53 being rotated, the feeding ring 96 rotates together with the clutch adjustment ring 53 to be moved in the axial direction through screw engagement. This moves the receiving ring 93 forward or rearward to change the pressing force of the coil springs 92.

The clutch adjustment ring 53 can vary the pressing force in a range from a minimum to a maximum. When the drill chuck 4 has large torque under the maximum pressing force, the pressing force of the coil spring 92 does not allow the balls 90 to move over the engagement projections on the internal gear 79C. In other words, the driver drill 1 serves as a drill with no clutch operation under the maximum pressing force.

The spindle 41 is axially supported by a bearing 97A (ball bearing) and a bearing 97B (metal bearing) inside the smaller-diameter portion 63 of the second gear case 51. The spindle 41 has its rear end movably inserted into the carrier 76C in the third stage. The carrier 76C has three tabs 98 protruding from its front. Each tab 98 engages with the outer circumference of the spindle 41. The spindle 41 thus rotates together with the carrier 76C.

Three wedge pins 99 are respectively located between the three tabs 98. The three wedge pins 99 are in contact with three flat edges 100 on the outer circumference of the spindle 41. When the drill chuck 4 is rotated to receive or remove a bit with the brushless motor 20 being stopped, each wedge pin 99 is firmly inserted between the corresponding tab 98 and the corresponding flat edge 100 to lock rotation of the spindle 41.

In the driver drill 1 with the structure described above, an operator presses the trigger 43 to turn on the switch 42. In response to this operation, the microcomputer in the controller turns on or off each switching element to start powering the coils 25. The powered coils 25 generate a magnetic field in the stator 21 to rotate the rotor 22.

Each rotation detecting element in the sensor circuit board 28 outputs a rotation detection signal indicating the position of the permanent magnets 30. The microcomputer in the controller thus determines the rotational state of the rotor 22. The microcomputer controls the on-off state of each switching element in accordance with the determined rotational state to apply currents through the coils 25 in different phases in the stator 21 sequentially. This continuously rotates the rotor 22 to rotate the rotational shaft 31. As the rotational shaft 31 rotates, the pinion 56 rotates to rotate the spindle 41 via the reducing mechanism 75. This allows screwing or other operations using a bit received by the drill chuck 4.

The pressing force of the coil springs 92 restricts rotation of the internal gear 79C with the balls 90 between them. When the torque on the spindle 41 increases and exceeds the pressing force of the coil springs 92, the balls 90 move over the engagement projections on the front surface of the internal gear 79C, allowing the internal gear 79C to rotate without engagement. This disables transmission of a rotational force to the spindle 41. The clutch adjustment ring 53 is rotated to change the clutch operation torque.

The driver drill 1 according to the first embodiment includes the brushless motor 20 (motor) including the stator 21 and the rotor 22 rotatable relative to the stator 21. The driver drill 1 also includes the cylindrical motor housing 8 (motor housing) accommodating the brushless motor 20 and including the left housing 8*a* and the right housing 8*b* that are laterally separated, and the grip 3 connected to the lower portion of the motor housing 8. The driver drill 1 also includes the spindle 41 (output unit) in front of the brushless motor 20 and driven by the brushless motor 20, and the rear cover 7 supporting the rear portion of the rotor 22 and closing the rear portion of the motor housing 8. The rear cover 7 is held and fastened between the left housing 8*a* and the right housing 8*b*.

This structure eliminates screwing portions, such as screw bosses for fastening the rear cover 7, in the motor housing 8. The use of the rear cover 7 thus reduces the entire length and downsizes the motor housing 8 in the radial direction. The use of the rear cover 7 also eliminates screws for fastening the rear cover 7, simplifying assembly and thus reducing the production costs.

The rotor 22 includes the rotational shaft 31 extending in the front-rear direction. The rear cover 7 holds, on its inner surface, the bearing 32 supporting the rear end of the rotational shaft 31. This structure holds the bearing 32 accurately in the radial direction.

The fan 33 is fixed on the rotational shaft 31 in front of the bearing 32. The bearing 32 overlaps the fan 33 in the radial direction of the bearing 32.

Although the fan 33 is used, the rear cover 7 is thus downsized in the front-rear direction, effectively reducing the entire length.

The rear cover 7 is a cap having the opening in its front. The opening of the rear cover 7 has, on its inner edges, the connection members 12 facing frontward and held between the left and right housings 8*a* and 8*b*. The use of the connection members 12 reliably holds and fastens the rear cover 7.

The rear cover 7 has a right-and-left pair of the connection members 12. The rear cover 7 is thus held and fastened by the left and right housings 8*a* and 8*b* in a balanced manner.

The connection members 12 have, on their outer circumferential surfaces, the ridges 13 raised outward. The motor housing 8 has, on its inner surface, the engagement grooves 16 engaged with the ridges 13. This reliably prevents the held and fastened rear cover 7 from slipping off rearward.

The rear surface of the rear cover 7 is on a plane defined in the vertical and lateral directions. The rear cover 7 is thus downsized in the front-rear direction.

The gear cover ring 52 is screwed to be closer to the receiving ribs 59. This causes the second gear case 51 to come in close contact with the first gear case 50. This prevents the first gear case 50 and the second gear case 51 from being separated from each other. The first gear case 50 separated from the second gear case 51 disables the use of the driver drill 1 as a drill described above. In other words, this is because the balls 90 move over the engagement projections when the clutch adjustment ring 53 is rotated to maximize the pressing force of the coil spring 92.

Second Embodiment

Other embodiments of the present invention will now be described. A second embodiment is the same as the first embodiment except the shape and the holding structure of the rear cover. The same components as in the above embodiment are given the same reference numerals and will not be described repeatedly.

In a driver drill 1A shown in FIGS. 11 to 14, the body housing 6 does not have an engagement tab in contact with the lower surface of a rear cover 7A unlike in the first embodiment. The motor housing 8 thus has the totally flat rear end surface 8*c* along the entire circumference. The rear cover 7A has a lower portion, rather than the flat surface, integral with a hanging part 7*c* replacing the engagement tab.

The driver drill 1A also eliminates screwing portions, such as screw bosses for fastening the rear cover 7A, in the motor housing 8. The use of the rear cover 7A thus reduces the entire length and downsizes the motor housing 8 in the radial direction. The use of the rear cover 7A also eliminates screws for fastening the rear cover 7A, simplifying assembly and thus reducing the production costs.

Third Embodiment

In a driver drill 1B described in FIGS. 15 to 18, the rear portion of the motor housing 8 extends to a position at which the rear end surface 8*c* is located behind the fan 33. The left and right housings 8*a* and 8*b* have semicircular, circumferential receiving grooves 105 on their inner surfaces behind the fan 33.

The rear cover 7B is a circular plate as viewed from the front rather than a cap. The rear cover 7B has the bearing holder 10 at the center of its front surface. The rear cover 7B fitted with the receiving grooves 105 is held by the left and right housings 8*a* and 8*b*. The rear cover 7B is thus located frontward from the rear end surface 8*c* of the motor housing 8 and is unexposed as viewed laterally. The motor housing 8 has the outlets 11 in its right and left side surfaces and outward from the fan 33.

The driver drill 1B also eliminates screwing portions, such as screw bosses for fastening the rear cover 7B, in the motor housing 8. The use of the rear cover 7B thus reduces the entire length and downsizes the motor housing 8 in the radial direction. The use of the rear cover 7B also eliminates screws for fastening the rear cover 7B, simplifying assembly and thus reducing the production costs. In addition, the rear cover 7B frontward from the rear end surface 8*c* of the motor housing 8 further reduces the entire length.

Modifications will now be described.

In the first and second embodiments, the rear cover may have a larger number of connection members at circumferentially smaller intervals rather than the right-and-left pair of the connection members. The connection members may have different lengths. The connection members may have projections on their outer circumferential surfaces rather than ridges. A larger number of sets of a ridge or another protrusion and an engagement groove may be used. In contrast, a single set of a ridge or another protrusion and an engagement groove, rather than the rectangular groove, may be used to prevent the rear cover from slipping off.

The third embodiment is also not limited to the structure in which the motor housing has, on its inner circumferential surface at the rear end, receiving grooves to hold the rear cover. Depending on the thickness, the rear cover may have, for example, a receiving groove on its outer circumferential surface, and the motor housing may have a ridge or a projection engaged with the receiving groove on its inner circumferential surface at the rear end.

In the embodiments, the motor may be a commutator motor rather than the brushless motor.

In the embodiments, the left housing and the right housing may not be halves. A separate motor housing and a separate grip may be connected to each other.

The embodiments are not limited to the structure in which the bearing held by the rear cover overlaps the fan. With the fan in front of the rotor, for example, the bearing may radially overlap an insulator or other components in the motor. The bearing may not overlap the motor. With the fan frontward, the rear cover may have inlets as vents.

In each embodiment, the reducing mechanism may have a different number of stages. A transmission may be designed differently, or may be eliminated. An electric clutch may be used rather than the mechanical clutch.

The present invention is applicable not only to a driver drill but also to other power tools, such as a vibration driver drill having a vibration assembly, an impact driver, and a screw driver. The power tools may operate on an alternating current (AC) without including battery packs.

REFERENCE SIGNS LIST

- 1, 1A, 1B driver drill
- 2 body
- 3 grip
- 4 drill chuck
- 5 battery pack

6 body housing
6*a*, 6*b* housing half
7, 7A, 7B rear cover
7*xa* left recess
7*xb* right recess
8 motor housing
8*a* left housing
8*b* right housing
8*c* rear end surface
8*xa* left rear protrusion
8*xb* right rear protrusion
8*za* logotype display
8*zb* product information labelling portion
9, 71 screw
10 bearing holder
12 connection member
13 ridge
13*a* rectangular groove
14 rear rib
15 front rib
16 engagement groove
17, 67 screw boss
20 brushless motor
21 stator
22 rotor
31 rotational shaft
32 bearing
33 fan
40 gear assembly
41 spindle
50 first gear case
51 second gear case
52 gear cover ring
53 clutch adjustment ring
57 flange
61 larger-diameter portion
62 medium-diameter portion
63 smaller-diameter portion
66 screwing portion
68 protruding edge
75 reducing mechanism
105 receiving groove

What is claimed is:

1. A power tool, comprising:
a left housing;
a right housing;
a motor accommodated in a rear of the left housing and the right housing, the motor having a shaft rotatable about a center axis extending in a front-rear direction;
a gear case disposed frontward from the motor, the gear case including
a first gear case, and
a second gear case located in front of the first gear case;
a gear cover ring formed from metal, the gear cover ring configured to press the second gear case toward the first gear case; and
a plurality of screws configured to fix the gear cover ring to the left housing and the right housing.

2. The power tool according to claim 1, wherein
the second gear case includes:
a first diameter portion having a plurality of protrusions on an outer circumferential surface, and
a second diameter portion located rearward from the first diameter portion, the second diameter portion having a larger diameter than the first diameter portion, and
the gear cover ring has, on an inner circumferential surface, a plurality of grooves to be engaged with the plurality of protrusions.

3. The power tool according to claim 2, wherein
the plurality of screws includes
an upper right screw located in an upper right direction from the center axis,
a lower right screw located in a lower right direction from the center axis,
an upper left screw located in an upper left direction from the center axis, and
a lower left screw located in a lower left direction from the center axis,
the plurality of protrusions includes
a right protrusion located right side from the center axis, and
a left protrusion located left side from the center axis,
the plurality of grooves includes
a right groove located right side from the center axis, and
a left groove located left side from the center axis,
the right protrusion and the right groove are located between the upper right screw and the lower right screw in an up-down direction, and
the left protrusion and the left groove are located between the upper left screw and the lower left screw in the up-down direction.

4. The power tool according to claim 1, further comprising:
a speed switch lever movable in a front-rear direction,
wherein the gear cover ring has, in an upper portion, a recess to receivable a front portion of the speed switch lever.

5. The power tool according to claim 2, further comprising:
a speed switch lever movable in a front-rear direction,
wherein the gear cover ring has, in an upper portion, a recess to receivable a front portion of the speed switch lever.

6. The power tool according to claim 3, further comprising:
a speed switch lever movable in a front-rear direction,
wherein the gear cover ring has, in an upper portion, a recess to receivable a front portion of the speed switch lever.

7. The power tool according to claim 1, wherein
the groove is located radially inward from the plurality of screws within a range of the screw in the front-rear direction.

* * * * *